United States Patent
Hwang et al.

(10) Patent No.: US 9,286,165 B2
(45) Date of Patent: Mar. 15, 2016

(54) APPARATUS AND METHOD FOR RECOVERING PARTITION USING BACKUP BOOT RECORD INFORMATION

(71) Applicant: ELECTRONICS AND TELECOMMUNICATIONS RESEARCH INSTITUTE, Daejeon (KR)

(72) Inventors: Hyun-Uk Hwang, Daejeon (KR); Ki-Bom Kim, Cheongju-si (KR); Seung-Yong Lee, Daejeon (KR); Young-Chan Shin, Daejeon (KR); Tae-Joo Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 182 days.

(21) Appl. No.: 13/958,541

(22) Filed: Aug. 3, 2013

(65) Prior Publication Data

US 2014/0059313 A1    Feb. 27, 2014

(30) Foreign Application Priority Data

Aug. 23, 2012    (KR) .................. 10-2012-0092498

(51) Int. Cl.
| | |
|---|---|
| G06F 12/00 | (2006.01) |
| G06F 11/14 | (2006.01) |
| G06F 13/00 | (2006.01) |
| G06F 13/28 | (2006.01) |
| G06F 17/30 | (2006.01) |

(52) U.S. Cl.
CPC ........ *G06F 11/1435* (2013.01); *G06F 11/1417* (2013.01); *G06F 17/30117* (2013.01)

(58) Field of Classification Search
CPC .......... G06F 11/1417; G06F 17/30117; G06F 11/1435
USPC .......................................... 711/162
See application file for complete search history.

(56) References Cited

U.S. PATENT DOCUMENTS

| | | | |
|---|---|---|---|
| 6,308,264 B1 * | 10/2001 | Rickey .............................. 713/2 |
| 8,006,125 B1 * | 8/2011 | Meng et al. .................. 714/6.12 |
| 2007/0073978 A1 | 3/2007 | Lee |
| 2011/0055163 A1 * | 3/2011 | Hwang et al. ................. 707/675 |
| 2011/0202794 A1 | 8/2011 | Kim |

(Continued)

FOREIGN PATENT DOCUMENTS

| | | |
|---|---|---|
| KR | 10-2007-0035164 A | 3/2007 |
| KR | 10-2008-0107629 A | 12/2008 |

(Continued)

*Primary Examiner* — Mark Giardino, Jr.
(74) *Attorney, Agent, or Firm* — LRK Patent Law Firm (57) ABSTRACT

In a method for recovering a partition using backup boot record information, an unallocated area is separated from a disk or an evidence image. The unallocated area is searched for a location of a backup boot record. Whether is backup boot record of a file system to be detected is present in found sectors is analyzed. If the backup boot record is found to be the backup boot record of the file system desired to be detected as a result of the analysis, it is verified whether the backup boot record is a boot record of a valid partition. If it is verified that the backup boot record is the boot record of the valid partition, a file system of a deleted partition is parsed using the backup boot record and a deleted directory or file is recovered.

8 Claims, 10 Drawing Sheets

(56) References Cited

U.S. PATENT DOCUMENTS

2012/0066546 A1  3/2012  Kim
2012/0131072 A1* 5/2012  Fuentes, II .................. 707/822

FOREIGN PATENT DOCUMENTS

| KR | 10-2011-0021125 A | 3/2011 |
| KR | 10-2011-0094468 A | 8/2011 |

* cited by examiner

| | TOTAL SECTOR OFFSET | $MFT START OFFSET | $MFTMirr START OFFSET | ROOT DIRECTORY CLUSTER | MFT ENTRY SIZE | BACKUP BR's OFFSET |
|---|---|---|---|---|---|---|
| NTFS's BR | 40-47 | 48-55 | 56-63 | - | 28-31 | - |
| FAT32's BR | 32-35 | - | - | 44-47 | - | 50-51 |
| FAT64's BR | 72-79 | - | - | 96-99 | - | - |

APPARATUS AND METHOD FOR RECOVERING PARTITION USING BACKUP BOOT RECORD INFORMATION

CROSS REFERENCE TO RELATED APPLICATION

This application claims the benefit of Korean Patent Application No. 10-2012-0092498, filed on Aug. 23, 2012 which is hereby incorporated by reference in its entirety into this application.

BACKGROUND OF THE INVENTION

1. Technical Field

The present invention relates generally to an apparatus and method for recovering a partition using backup boot record information and more particularly, to an apparatus and method for recovering a partition, which can perform fast partition recovery using a backup boot record.

2. Description of the Related Art

A hard disk is divided into a plurality of partitions so as to efficiently operate the disk, and is managed based on the partitions. Among the partitions, a Disk Operating System (DOS) partition that is the most typically used enables partitions to be managed through a partition table and also enables a plurality of partitions to be managed using the concept of an extended partition.

In digital forensics, in order to recover a deleted partition when a partition has been deleted, methods of recovering the partition in such is way that a user manually searches for partition information or analyzes a partition table are used. In this case, a problem arises in that, with the development of hardware, the capacity of to disk has increased, so a lot of time is required in order to search for information about a deleted partition, and in that when recovery is manually conducted, a user must have technical knowledge.

In detail, conventional technology for recovering a partition is implemented using a method of checking a disk map provided by a forensic tool and directly and manually adding the deleted partition, or a method of analyzing a Master Boot Record (MBR), sequentially searching all sectors for deleted partition information, and then recovering the deleted partition. However, such conventional technology is disadvantageous in that, in order to manually add the deleted partition, a user must have technical knowledge, and the method of sequentially accessing and searching all sectors requires a long time, from a minimum of several tens of minutes to a maximum of several tens of hours depending on the disk capacity.

Korean Unexamined Patent Publication No. 2008-0107629 discloses a method of recovering a system using a previously created backup file necessary for booting, but the technology disclosed in this patent is intended to recover an operating system, and is limited in that a previously deleted partition is not taken into consideration.

Therefore, an efficient partition recovery method and apparatus are required which provide partition, recovery information found in a hard disk or an evidence image to a user within a short period of time and which manage the recovered partition.

SUMMARY OF THE INVENTION

Accordingly, the present invention has been made keeping in mind the above problems occurring in the prior art, and an object of the present invention is to provide a method and apparatus that promptly locate and recover a deleted partition using backup boot record information when a boot record indicative of the volume information of a large-capacity hard disk and an evidence image is deleted in digital forensics.

The object of the present invention is not limited to the above object, and other objects, not described herein, will be clearly understood by those skilled in the art from the following description.

In accordance with an aspect of the present invention to accomplish the above object, there is provided a method for recovering a partition using backup boot record information, including separating an unallocated area from a disk or an evidence image, searching the unallocated area for a location of a backup boot record, analyzing whether a backup boot record of a file system desired to be detected is present in found sectors, if the backup boot record is found to be the backup boot record of the file system desired to be detected as a result of the analysis, verifying whether the backup boot record is a boot record of a valid partition, and if it is verified that the backup boot record is the boot record of the valid partition, parsing a file system of a deleted partition using the backup boot record, and recovering a deleted directory or file.

Preferably, separating the unallocated area may include analyzing a Disk Operating System (DOS) partition table from the disk or the evidence image, and collecting partition information about a non-deleted normal partition, and parsing a file system of the normal partition, collecting information about a normal file and a deleted file, classifying the normal file and deleted file as an allocated area, and classifying a remaining area as the unallocated area.

Preferably, separating the unallocated area may be configured to convert information about sectors of the disk or the evidence image into Linear Block Addressing (LBA)-based addresses, and classify the sectors into an allocated area and the unallocated area.

Preferably, searching for the location of the backup boot record may be configured to search for the backup boot record depending on a type of file system based on an input sector map table.

Preferably, when the file system is a New Technology File System (NTFS), the backup boot record may be searched for by jumping to a sector previous to sectors searched by a unit of a cylinder or by a unit of 2048 sectors.

Preferably, when the file system is File Allocation Table 32 (FAT32), the backup boot record may be searched for by jumping, to a sixth sector of sectors searched by a unit of a cylinder or by a unit of 2048 sectors.

Preferably, when the file system is FAT64, the backup boot record may be searched for by jumping to a twelfth sector of sectors searched by a unit of a cylinder or by a unit of 2048 sectors.

Preferably, searching for the location of the backup boot record may be configured to search the unallocated area while jumping the unallocated area by a unit of a cylinder or by a unit of 2048 sectors, and analyze whether a specific sector is the backup boot record.

Preferably, searching by the unit of the cylinder and searching by the unit of 2048 sectors may be simultaneously performed in a form of threads.

Preferably, determining whether the backup boot record is the boot record of the valid partition may include, when the file system is an NTFS, determining that the backup boot record is the valid backup boat record based on offsets 40 to 47, offsets 28 to 31, and $MFT file name among MFT entry attributes of an $MFT file, and if the $MFT file is not present, determining that the backup boot record is the valid backup boot record, based on offsets 40 to 47, offsets 28 to 31, and $MFTMirr (MFT mirror) file name among MFT entry attributes of an $MFTMirr file.

Preferably, determining whether the backup boot record is the boot record of the valid partition may include, when the file system is FAT32 or FAT64, searching attributes of the backup boot record for a location of a root directory cluster, determining whether a corresponding sector has attributes of a directory entry at the location of the root directory cluster, and if among the attributes of the directory entry, offsets 72 to 79 and offsets 96 in 99 correspond to the attributes a the directory entry, verifying that the backup boot record is the valid backup boot record.

In accordance with another aspect of the present invention to accomplish the above object, there is provided an apparatus for recovering a partition using backup boot record information, including an access unit configured to access a disk or an evidence image and read information about the disk or the evidence image, a file system parsing unit configured to analyze a partition table of the disk or the evidence image, and parse to file system of a corresponding volume, a sector map construction unit configured to construct a sector map table for separating the disk or the evidence image into an allocated area and an unallocated area, a backup boot record searching unit configured to search for a sector in which a backup boot record is present, using information of the unallocated area, a partition verification unit configured to verify whether the backup boot record found by the backup boot record searching unit is valid, and a file system generation unit configured to parse a file system using the backup boot record and recover at deleted file or directory.

Preferably, the sector map construction unit may convert information about sectors of the disk or the evidence image into Linear Block Addressing (LBA)-based addresses, and classify the sectors into an allocated area and the unallocated area.

Preferably, the backup boot record searching unit may search for the backup boot record depending on a type of file system based on the sector map table.

Preferably, the backup boot record searching unit may be configured to, when the file system is a New Technology File System (NTFS), search for the backup boot record by jumping to a sector previous to sectors searched by a unit a cylinder or by a unit of 2048 sectors, when the file system is File Allocation Table 32 (FAT32), search for the backup boot record by jumping to a sixth sector of sectors searched by a unit of a cylinder or by a unit of 2048 sectors, and when the system is FAT64, search for the backup boot record by jumping to a twelfth sector of sectors searched by a unit of a cylinder or by a unit of 2048 sectors.

Preferably, the backup boot record searching unit may be configured to search the unallocated area jumping the unallocated area by a unit of a cylinder or by a unit of 2048 sectors, and analyze whether a specific sector is the backup boot record.

Preferably, the backup boot record searching unit may simultaneously perform searching by the unit of the cylinder and searching by the unit a 2048 sectors in a form of threads.

Preferably, the partition verification unit may be configured to, when the file system is an NTFS, determine whether the backup boot record is the valid backup boot record, based on attributes corresponding to a signature, an MFT entry size, and is file name of an $MFT file or an $MFTMirr (mirror) file.

Preferably, the partition verification unit may be configured to, when the file system is FAT32 or FAT64, search the backup boot record for a location of a root directory cluster, and determine whether the corresponding sector has attributes of directory entry at the location of the root directory cluster, thus verifying that the backup boot record is the valid backup boot record.

Preferably, the apparatus may further include a user interface unit configured to provide results of analysis to a user.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly in the drawings, the shapes and sizes of elements may be exaggerated for the sake of clearer description.

Hereinafter, preferred embodiments of the present invention will be described in detail with reference to the attached drawings.

Technology for recovering a deleted partition may be implemented by using boot record information. In a disk management tool on Windows, a partition management function supports functions such as the deletion and formatting of partitions (extension or reduction of partitions). When such a partition management function is performed, existing partition information is deleted from a master boot record, and when partitions are formatted, new format information is overwritten onto existing boot record information. However, when formatting is performed after partitions have been reconstructed via the extension or reduction of a partition, there is a probability that backup boot record information of the existing partition will be present, and the partition may be recovered if such backup boot record information is found.

Figure 1:
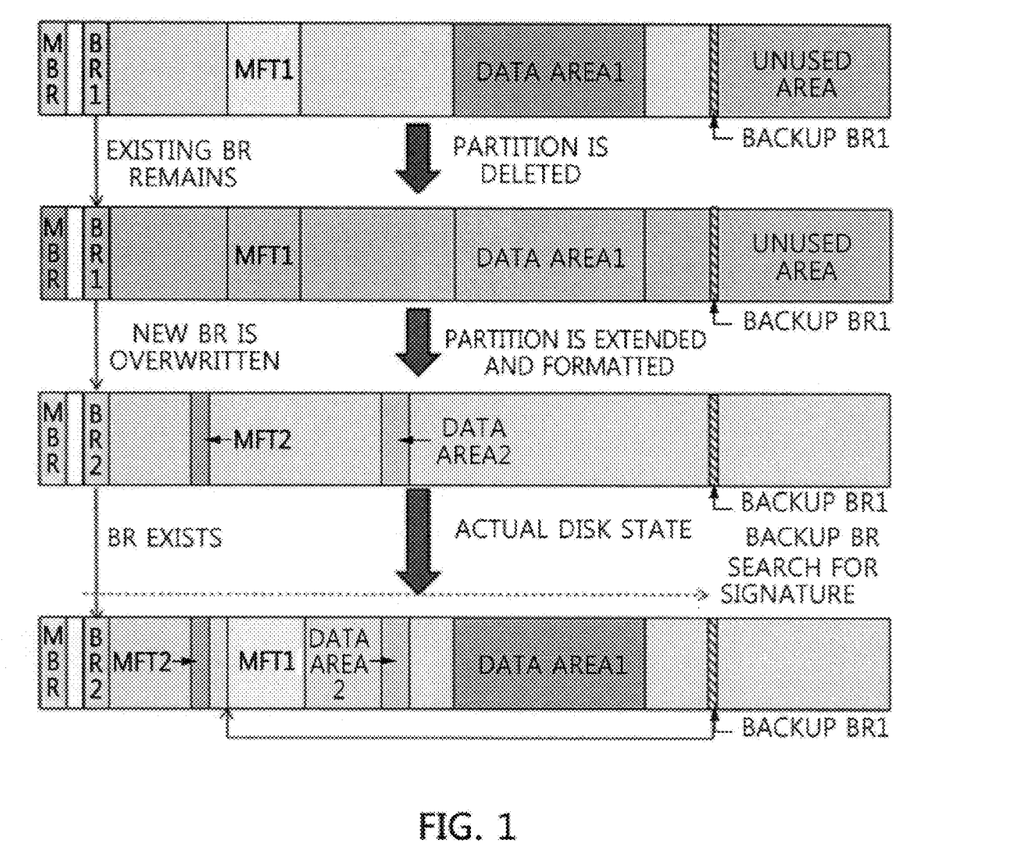
FIG. 1 is a diagram showing a state in which data is written to a disk, the partition of which has changed, according to an embodiment of the present invention.

Referring to FIG. 1, an image in a first stage shows that a disk composed of a single partition and an unused area includes a Boot Record 1 (BR1), a Master File Table 1 (MFT1), and a DATA1 area.

Thereafter, as shown in an image in a second stage, when the partition is deleted, the existing partition information is deleted from a Master Boot Record (MBR). If the partition has been extended and reformatted (fast formatting), BR2 is overwritten onto existing BR1, as shown in an image in a third stage. Consequently, as shown in an image in a fourth stage, if the actual state at the disk is taken into consideration, existing MFT1, DATA1 area, and information about existing backup BR1 are present.

In order to find a delete boot record, conventional technology for recovering a partition is configured to sequentially search all sectors for boot record information or prompt an analyzing user to manually recover the partition, and does not use a recovery method using a backup boot record by searching for a boot record in a volume and recovering the partition. Further, due to the influence of advanced disk technology, as the unit of an area in which partitions are generated has increased, a variation in the location of a boot record that does not comply with an existing Cylinder-Header-Sector (CHS) calculation is also present.

Figure 2:
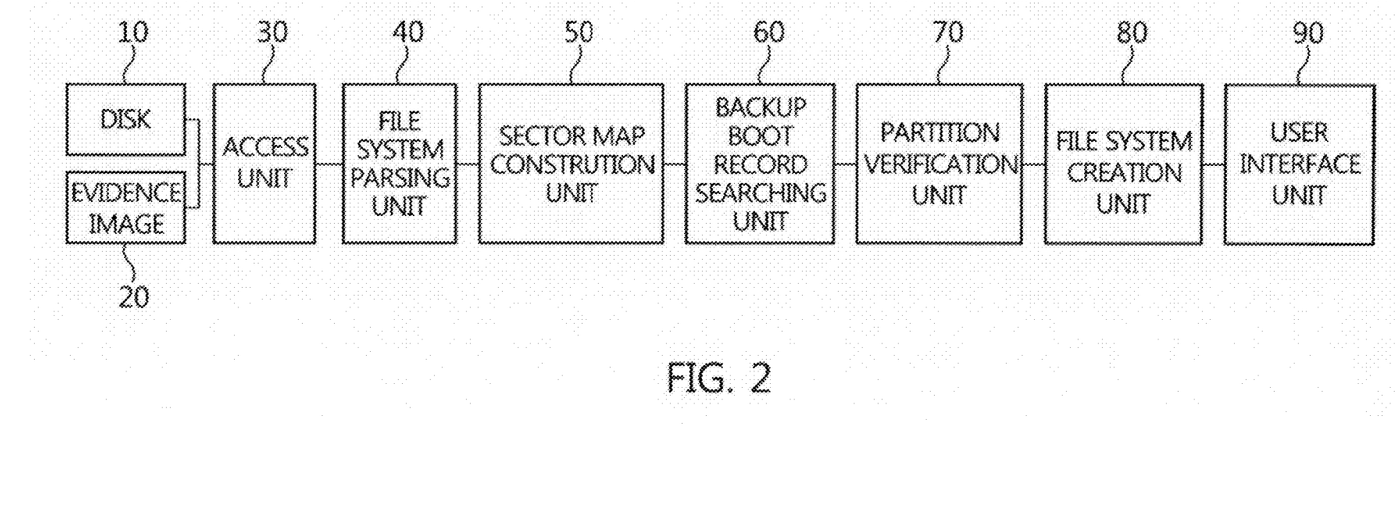
FIG. 2 is a block diagram showing an apparatus for recovering a partition based on backup boot record information according to an embodiment of the present invention.
Figure 3:
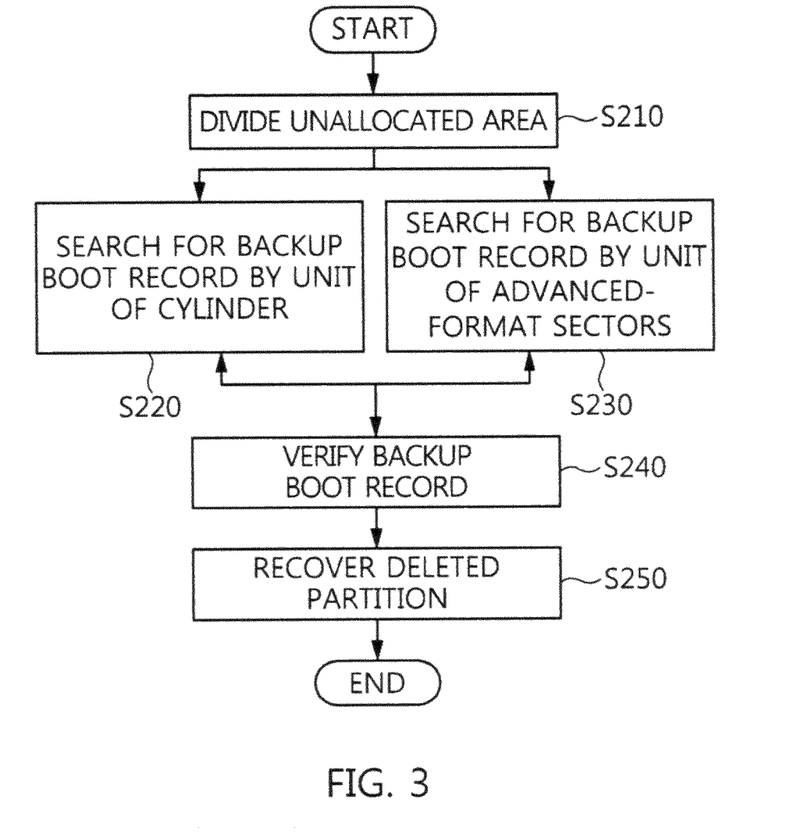
FIG. 3 is a flowchart showing a method of recovering a partition based on backup boot record information according to an embodiment of the present invention.

Below, a partition recovery method and apparatus according to an embodiment of the present invention will be described with reference to FIGS. 2 and 3. FIG. 2 is a block diagram showing an apparatus for recovering a partition using a backup boot record according to an embodiment of the present invention, and FIG. 3 is a flowchart showing a method of recovering a partition using a backup boot record according to an embodiment of the present invention.

Referring to FIG. 2, the partition recovery apparatus according to the present embodiment includes an access unit 30, a file system parsing unit 40, a sector map construction unit 50, a backup boot record searching unit 60, a partition verification unit 70, a file system creation unit 80, and user interface unit 90.

The access unit 30 accesses data sources of digital forensics, that is, a hard disk or an evidence image (a DD image, an Expert Witness Format (EWF) image, or the like) which is a target to be checked and searched, and then reads a disk 10 or an evidence image 20.

The file system parsing unit 40 directly accesses the sectors of the disk 10 or the evidence image 20 using the access unit 30, analyzes a partition table, parses a file system present in the corresponding volume, and provides the results of the parsing in the form of directories and files. In this case, all of normal files and deleted files in a normal volume are parsed.

The sector map construction unit 50 constructs the sector map of the disk 10 or the evidence image 20 at step S210.

The sector map can be divided into an allocated area and an unallocated area, wherein the allocated area can be divided into a metadata area for storing file system information and a data allocation area for storing the data information of files or the directories.

The unallocated area denotes an empty area (unused area) between the volumes of the entire disk, or an area that is not allocated in each volume (unallocated data area).

A detailed method in which the sector map construction unit 10 constructs the sector map will be described later with reference to FIG. 3.

The sector map construction unit 50 constructs the information of the unallocated area, for example, in such a way that the addresses of sectors of the unallocated area based on Linear Block Addressing (LBA) may be constructed in the form of a table.

The backup boot record searching unit 60 searches the unallocated area by the unit of a cylinder and by the unit of 2048 sectors using the information of the unallocated area constructed by the sector map construction unit 50, and then analyzes whether a backup boot record is present in a specific sector in consideration of specific locations of different backup boot records for File Allocation Table 32 (FAT32), FAT64, and New Technology File System (NTFS) at steps S220 and S230.

For example, in the case of the NTFS file system, analysis is performed to determine whether a sector just previous to (−1st sector) the sectors of each cylinder (16065 sectors) is a backup boot record.

Here, the backup boot record searching unit 60 simultaneously performs respective searching methods in the form of threads for the purpose of fast searching.

For the backup boot record found in this way, the partition verification unit 70 verifies whether the backup boot record is a valid backup boot record at step S240. A detailed description thereof will be made later with reference to FIG. 6.

The file system creation unit 80 parses the corresponding file system based on the boot record found by the backup boot record searching unit 60.

In this case, the file system creation unit 80 may parse the file system using the file system parsing unit 40. By parsing the file system, the deleted partition may be recovered at step S250.

The user interface unit 90 provides the function of adding the recovered partition as a virtual volume and allowing a user to use the virtual volume like a normal volume.

As described above, the partition recovery method and apparatus using backup boot record information according to the embodiment of the present invention separates an unallocated area from the disk or the evidence image, searches only the unallocated area (including all of an unallocated data area in a volume and an unused area of the disk) for a specific sector in which a backup boot record may be present, by the unit of a cylinder including sectors having a probability of a backup boot record being present and by the unit of 2048 sectors, an conformity with the characteristics of the respective file system, thus rapidly searching for the partition information and promptly recovering the partition.

Hereinafter, the partition recovery method and apparatus using backup boot record information will be described by providing detailed examples.

Figure 4:
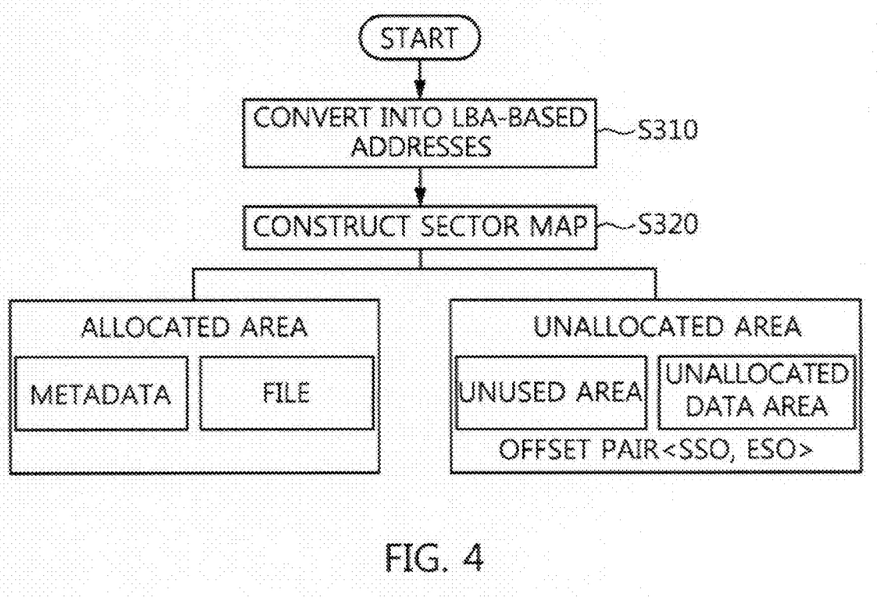
FIG. 4 is a flowchart showing a method of constructing the sector map of an entire disk or evidence image.

FIG. 4 is a flowchart showing a method in which the sector map construction unit 50 constructs the sector map of the entire disk or evidence image.

For the entire disk, pieces of information about respective sectors in each volume are converted into LBA-based addresses indicating information about the respective sectors at step S310.

For example, the addresses of the respective sectors of three volumes C, D, and E start at 0. However, in order to convert the addresses for the entire disk, a distance from a first MBR to volume C is added to the addresses of the respective sectors. Further, a distance from the first MBR to volume D is added to the addresses of the respective sectors. In this way, the addresses converted based on LBA are listed, and then a sector map divided into an allocated area and an unallocated area is constructed at step S320.

That is, the sector map is divided into the allocated area and the unallocated area, which may be represented by LBA-based addresses of the sectors corresponding to the respective areas.

A method of dividing a disk into an allocated area and an unallocated area may be configured to analyze a DOS partition table from a target disk to be checked or a target evidence image obtained by imaging the disk, collect normal (non-deleted) partition information, parse the file system of the corresponding partition, collect information about normal files and deleted files, classify the normal files and the deleted files as the allocated area, and classify the remaining area of the disk as the unallocated area.

Figure 5:
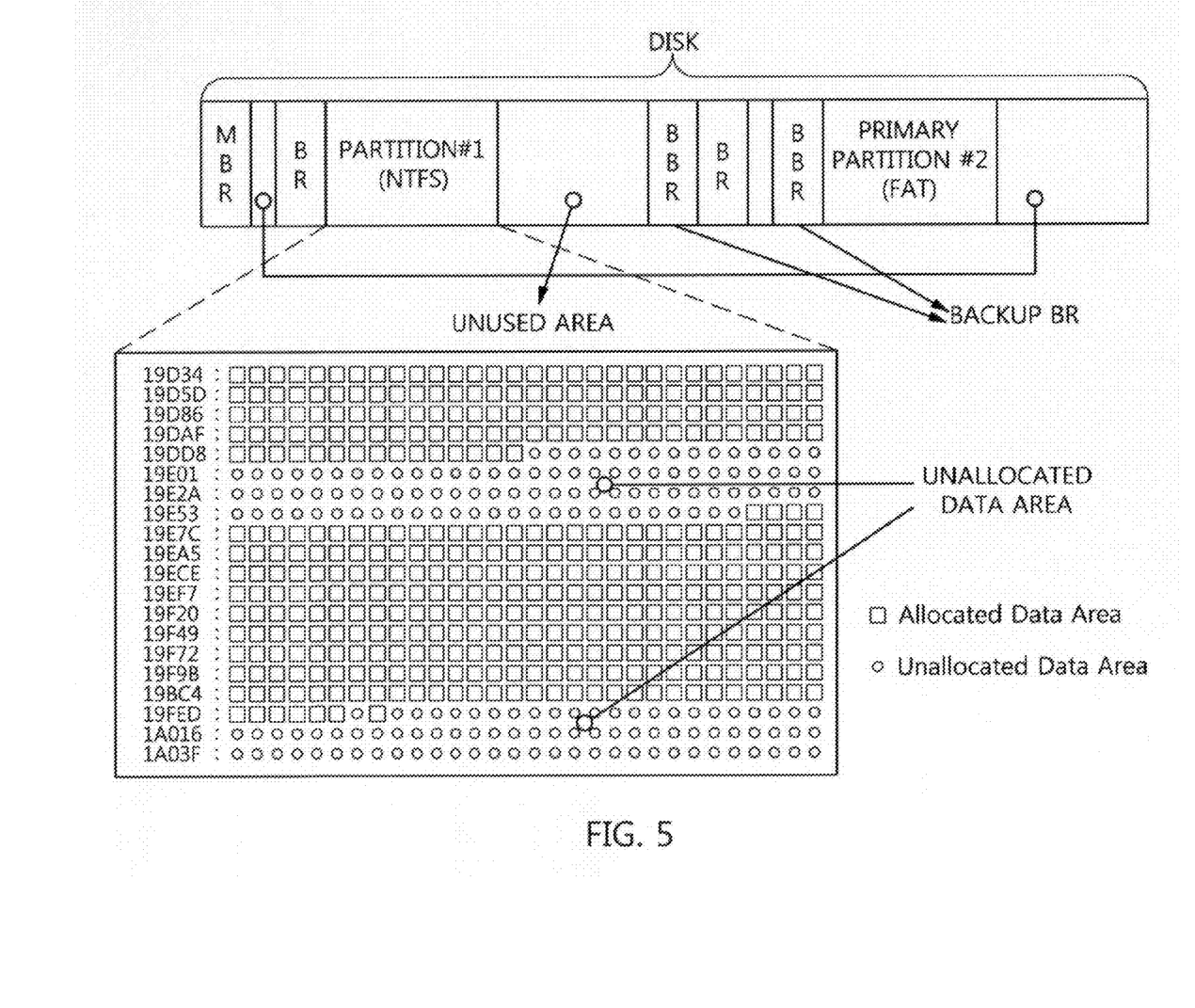
FIG. 5 is a conceptual diagram showing an unallocated area.

The unallocated area will be described in detail below with reference to FIG. 5. That is, the unallocated area may be mainly divided into two types.

One type is an unused area, which is an area of the disk other than partitions which currently exist in the disk, and denotes an empty space between volumes, or a space remaining after the last volume.

The other type is an unallocated data area, and denotes an area in which data is not stored in a normal volume (an area to which no data is allocated).

In this way, the disk or the evidence image is divided into an allocated area and an unallocated area, and each of the areas is represented by LBA-based addresses, thus enabling the sector map of the entire disk or the entire evidence image to be constructed.

Alternatively, the disk or evidence image is divided into an allocated area and an unallocated area, and only the unallocated area may be listed using LBA-based addresses because a target to be searched to recover a deleted partition is the unallocated area.

In this way, the sector map is constructed such that the sectors of the respective areas are arranged according to LBA-based addresses. Hereinafter, a portion in which the sectors of the unallocated area are arranged by LBA-based addresses is referred to as a sector map table.

The sector map table will be described in detail below. The sector map table may be indicated by pairs of offsets (offset pairs). For example, consecutive sectors of the unallocated area may be configured in the form of <SSO, ESO> LBA-based addresses. Here, SSO denotes a Start Sector Offset and ESO denotes in End Sector Offset at which a continuous unallocated area starting at SSO ends. That is, the entire unallocated area is composed of offset pairs indicated by <SSO, ESO>. For example, when the LBA-based addresses of the sectors of the unallocated area are 0~5 and 7~32, the sector map table may be composed of offset pairs indicated by <0,5> and <7,32>.

Next, with reference to FIG. 6, a process in which the backup boot record searching unit 60 searches the unallocated area by the unit of a cylinder (16065 sectors) and by the unit of 2048 sectors and then analyzes whether a specific sector is a backup boot record will be described in detail.

Figure 6:
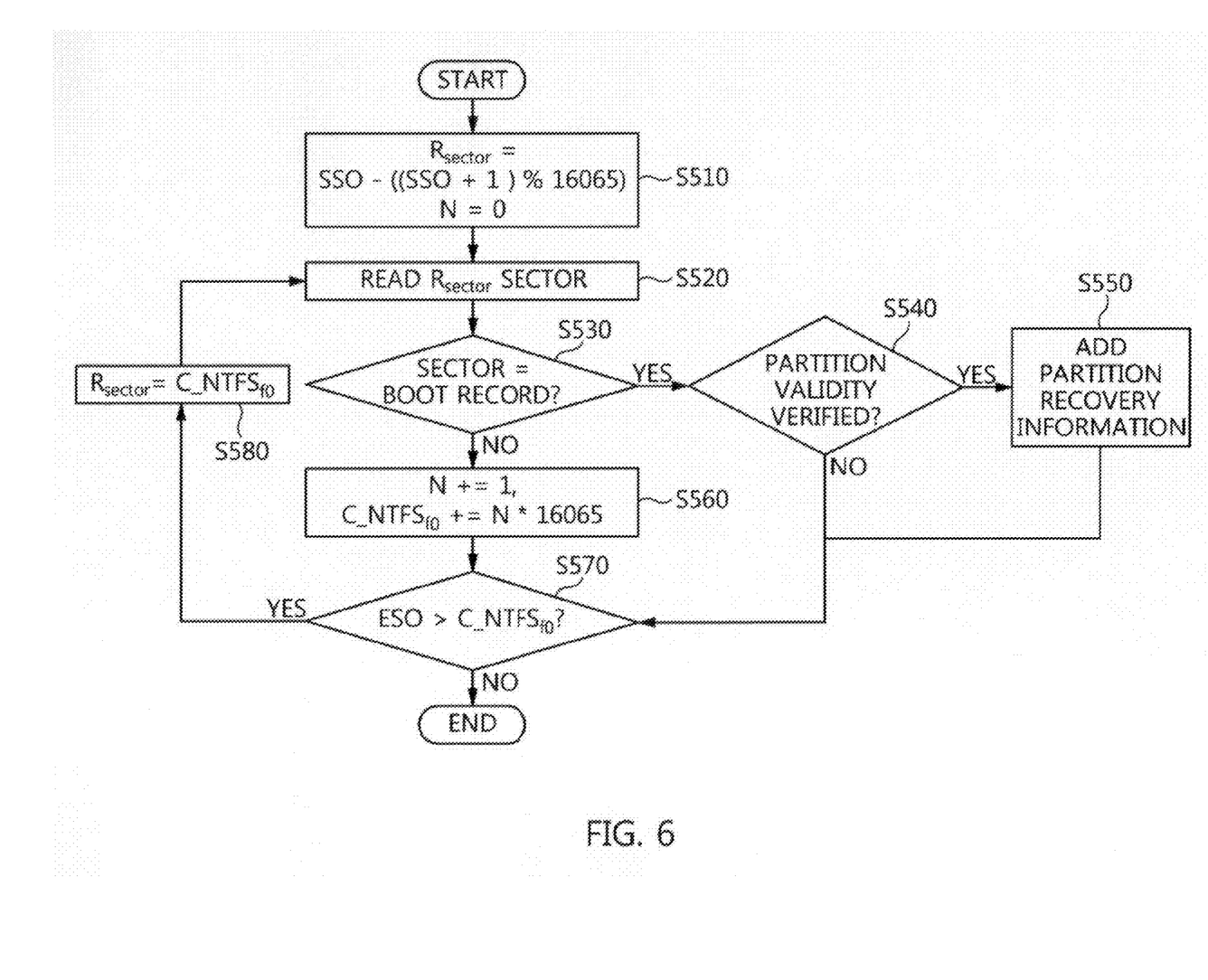
FIG. 6 is a flowchart showing a process for searching an unallocated area by the unit of cylinders and by the unit of extended sectors of an advanced-format disk (by the unit of 2048 sectors), and analyzing whether a specific sector is a backup boot record.

FIG. 6 is a flowchart showing a process for searching an unallocated area by the unit of a cylinder and by the unit of extended sectors of an advanced-format disk, and analyzing whether a specific sector is a backup boot record.

First, the backup boot record searching unit 60 is configured to, if a sector map table is input, calculate a specific location of a first backup boot record based on the corresponding sector at step S510. The backup boot record searching unit 60 obtains a jump offset based on SSO in first <SSO, ESO> received as an input. Since the location of the backup boot record differs depending on each file system, the jump offset is calculated by the following Equation (1). The minimum value of SSO is 2048 sectors or more.

$C\_NTFS_{fo}=SSO-((SSO+1)\% \; 16065)$ $M\_NTFS_{fo}=SSO-((SSO+1)\% \; 2048)$ $C\_FAT32_{fo}=SSO+(63+6-SSO \; \% \; 16065)$ $M\_FAT32_{fo}=SSO+(6-SSO \; \% \; 2048)$ $C\_FAT64_{fo}=SSO+(63+12-SSO \; \% \; 16065)$ $M\_FAT64_{fo}=SSO+(12-SSO \; \% \; 2048)$ (1)

(condition: SSO>2048)

$C\_NTFS_{fo}$ calculates the value of a sector in which a first backup boot record is likely present at Start Sector Offset (SSO). In the case of NTFS, the backup boot record is present at the last location of a volume slack, and can be calculated as −1st sector of a subsequently starting volume. For example, when an input sector map table value is <6297480, 8388607>, $C\_NTFS_{fo}=6297480-((297480+1)\% \; 16065)=6297479$ That is, $C\_NTFS_{fo}$ calculates a 6297479th sector as a sector in which a backup boot record is present. When the corresponding sector is present in an unallocated area, the sector is read at step S520, and it is determined whether the read sector is a backup boot record at step S530.

$C\_NTFS_{fo}$, $C\_FAT32_{fo}$, and $C\_FAT64_{fo}$ denote calculation formulas represented by the unit of the sectors of NTFS-, FAT32-, and FAT64-based cylinders, and $M\_NTFS_{fo}$, $M\_FAT32_{fo}$, and $M\_FAT64_{fo}$ respectively denote calculation formulas indicating the locations of backup boot records located at the first positions of NITS-, FAT32-, and FAT64-based 2048 sectors.

If the read sector is determined to be the backup boot record, the location of an original boot record is calculated using the boot record information, and if a normal boot record is present at the calculated location, it is verified by the partition verification unit 70 whether the normal boot record is a valid record at step S540.

If it is verified that the normal boot record is the valid record, information required to recover the partition is added at step S550, it is determined whether to terminate searching by comparing the End Sector Offset (ESO) with the location of the sector of the backup boot record at step S570.

If the sector location of the backup boot record is a location previous to the ESO, the current sector location of the backup boot record is input as the location of a sector in which searching is to be performed at step S580, and a procedure starting from step S520 is performed again.

If it is determined at step S530 that the read sector is not a backup boot record, the location of a subsequent sector to be searched is calculated using the above Equation (1) at step S560, and searching for a backup boot record is continuously performed at step S570.

Figure 8:
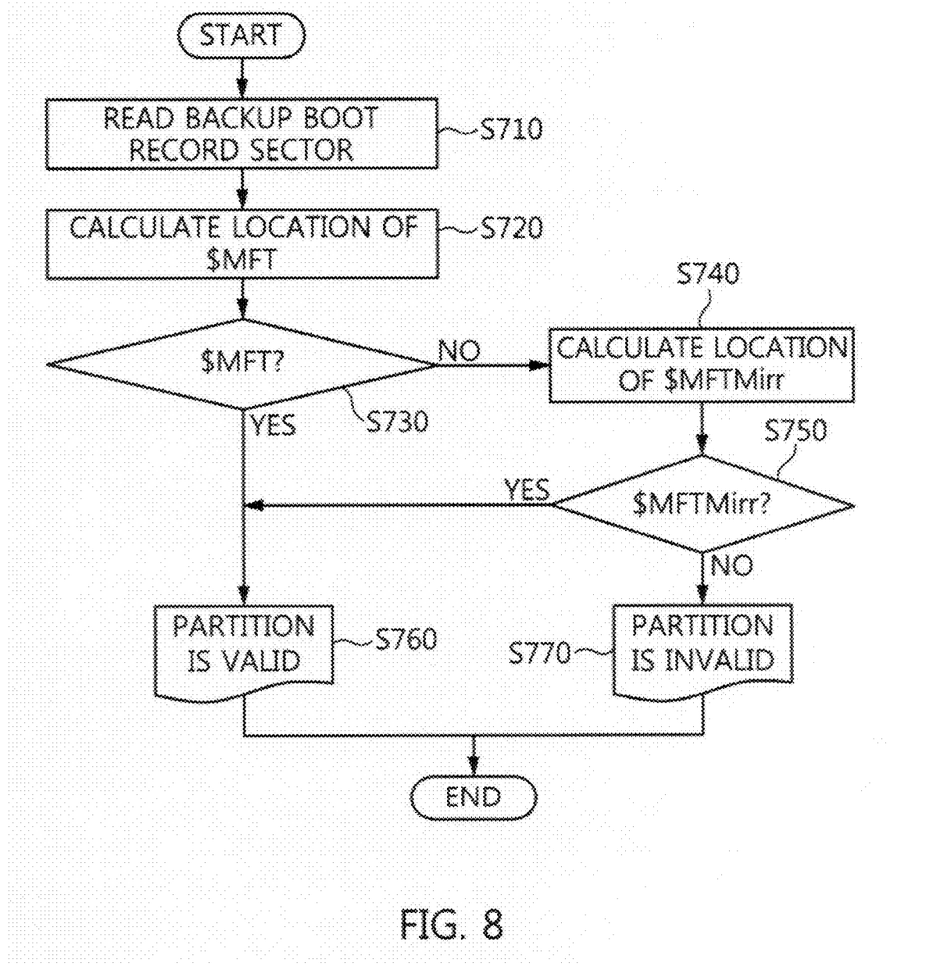
FIG. 8 is a flowchart showing a process for verifying the validity of the partition of a NTFS file system.

Next, a method of verifying the valid backup boot record of the NTFS file system will be described with reference to FIG. 8. In the case of the NTFS file system, in order to parse the NTFS file system into a directory tree structure, it is very important to determine whether MFT entries of an $MFT file and an $MFT Mirror ($MFTMirr) file, which is a backup file of the $MFT file, are present without being erased, and it is also important to determine whether an original boot record is present at a location calculated using the backup boot record.

A first backup boot record sector is read at step S710, and the location of $MFT is calculated at step S720. The location of $MFT offset is calculated by the following Equation (2):

$$\$MFT_{offset} = S_c(\text{backup boot record sector offset}) - T_v \\ (\text{total number of sectors in volume}) + S_{afi}(\$MFT \\ \text{start location}) \quad (2)$$

Figure 7:
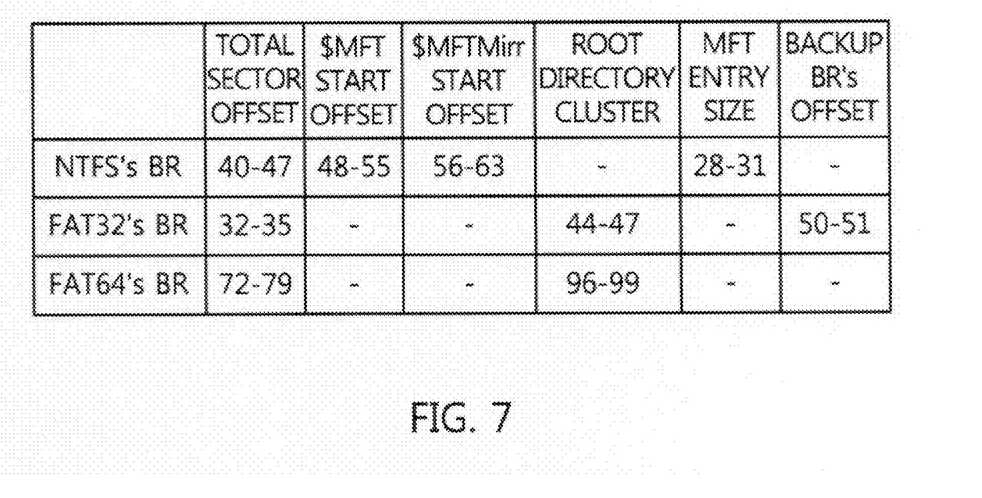
FIG. 7 is a table showing the locations of boot records of a volume corresponding to the total number of sectors in a volume, $MFT start offset, $MFT mirror ($MFTMirr) start offset, root directory cluster, and backup boot record offset in items constructing the boot records of NTFS, FAT32, and FAT64.

The value of Tv is obtained by merely reading the total sector offset of FIG. 7.

It is determined whether a $MFT file is present at the calculated location at step S730. If it is determined that the $MFT file is present at the calculated location, it is verified that the corresponding partition is a valid partition a step S760. If the $MFT file is not present, the location of $MFTMirr is calculated at stop S740, and it is determined whether a $MFTMirr file is present at step S750.

In this case, if it is determined that the $MFTMirr file is not present, either, it is verified that the corresponding partition is an invalid partition at step S770.

The location of the $MFTMirr offset is calculated by the following Equation (3):

$$\$MFT_{Mirroffset} = S_c(\text{current location of backup boot record}) - \\ T_v\begin{pmatrix}\text{total number of sectors}\\ \text{in volume}\end{pmatrix} + S_{mirr}(\text{start location of } \$MFTMirr) \quad (3)$$

Detailed criteria for determining the entries of $MFT and $MFTMirr are determined using items corresponding to the "FILE" signature of an MFT entry, the MFT entry size of FIG. 7 (offsets of FIG. 7) indicating the size of the MFT entry, and the file names of $MFT and $MFTMirr in $FILENAME attributes.

Figure 9:
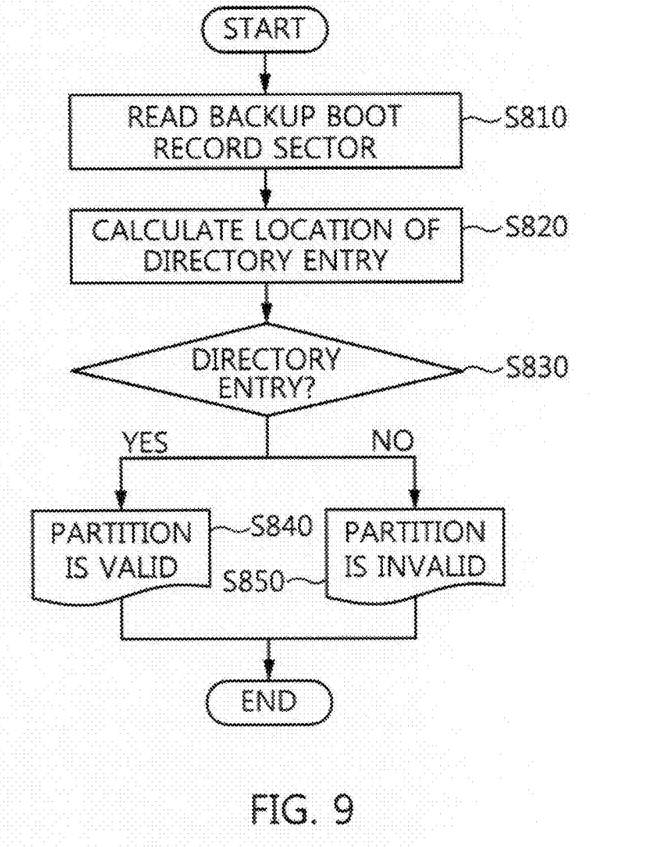
FIG. 9 is a flowchart showing a process for verifying the validity of the partition of FAT32 and FAT64 file systems.

Next, a method of verifying valid backup boot records of FAT32 and FAT64 file systems is illustrated in FIG. 9. In order to parse a FAT file system into a tree structure, the presence of a directory entry is a very important factor. Similar to the NTFS file system, a first backup boot record sector is read at step S810, and the location of a root directory cluster is calculated at step S820.

The offset location of the root directory cluster of the FAT32 file system is calculated by the following Equation (4):

$$\$RDC_{offset} = S_c(\text{backup boot record sector offset}) - 6 + \\ S_{rdc}(\text{start location of root directory cluster}) \quad (4)$$

The offset location of the root directory cluster of the FAT64 file system is calculated by the following Equation (5):

$$\$RDC_{offset} = S_c(\text{backup boot record sector offset}) - 12 + \\ S_{rdc}(\text{start location of root directory cluster}) \quad (5)$$

Detailed criteria for determining the root directory cluster are configured to determine whether the backup boot record sector corresponds to a directory entry based on the name item and NT resource item of the directory entry at step S830.

In this case, if the back tip boot record sector corresponds to the directory entry, it is verified that the corresponding partition is a valid partition a step S840, whereas if the sector of the backup boot record does not correspond to the directory entry, it is verified that the corresponding partition is an invalid partition at tee S850.

If the verification a validity of the partition has been completed in this way, partition recovery information is added. A sector to be subsequently checked is calculated by the following Equation (6):

$$C\_NTFS_{sn} = C\_NTFS_{fo} + (N*16065)(\text{increase } N \text{ by } 1, \\ \text{maximum value of } N \text{ is } \lfloor N_{max}\rfloor_{chs})$$

$$M\_NTFS_{sn} = M\_NTFS_{fo} + (N*2048)(\text{increase } N \text{ by } 1, \\ \text{maximum value of } N \text{ is } \lfloor N_{max}\rfloor_{2048})$$

$$C\_FAT32_{sn} = C\_FAT32_{fo} + (N*16065)(\text{increase } N \text{ by } 1, \\ \text{maximum value of } N \text{ is } \lfloor N_{max}\rfloor_{chs})$$

$$M\_FAT32_{sn} = M\_FAT32_{fo} + (N*2048)(\text{increase } N \text{ by } 1, \\ \text{maximum value of } N \text{ is } \lfloor N_{max}\rfloor_{2048})$$

$$C\_FAT64_{sn} = C\_FAT64_{fo} + (N*16065)(\text{increase } N \text{ by } 1, \\ \text{maximum value of } N \text{ is } \lfloor N_{max}\rfloor_{chs})$$

$$M\_FAT64_{sn} = M\_FAT64_{fo} + (N*2048)(\text{increase } N \text{ by } 1, \\ \text{maximum value of } N \text{ is } \lfloor N_{max}\rfloor_{2048}) \quad (6)$$

Sectors are checked within the range of N that does not exceed ESO while the value of N starts at a minimum value of 0 and sequentially increases by 1. If N exceeds the value of ESO, a subsequent sector map table is read and then checking is performed.

The maximum value of N is individually calculated by the following procedures. $\lfloor N_{max}\rfloor$(Ceiling) denotes rounding off, and $\lfloor N_{max}\rfloor_{chs}$ and $\lfloor N_{max}\rfloor_{2048}$ denote values obtained by rounding off resulting values divided by 16065 and 2048, and are calculated by the following Equation (7):

$$\lfloor N_{max}\rfloor_{chs} = (ESO-SSO)/16,065$$

$$\lfloor N_{max}\rfloor_{2048} = (ESO-SSO)/2,048 \quad (7)$$

In the present invention, when searching for the location of a backup boot record, searching is performed by the unit of a cylinder (16065 sectors) and by the unit of extended sectors (2048 sectors) based on advanced-format disk management, so that handling of recovery and two types of searching are implemented in the form of a multi-thread even in new disk technology, thus reducing the time required for searching.

Further, the present invention enables backup boot record information to be searched for, thus improving a partition recovery technique.

Figure 10:
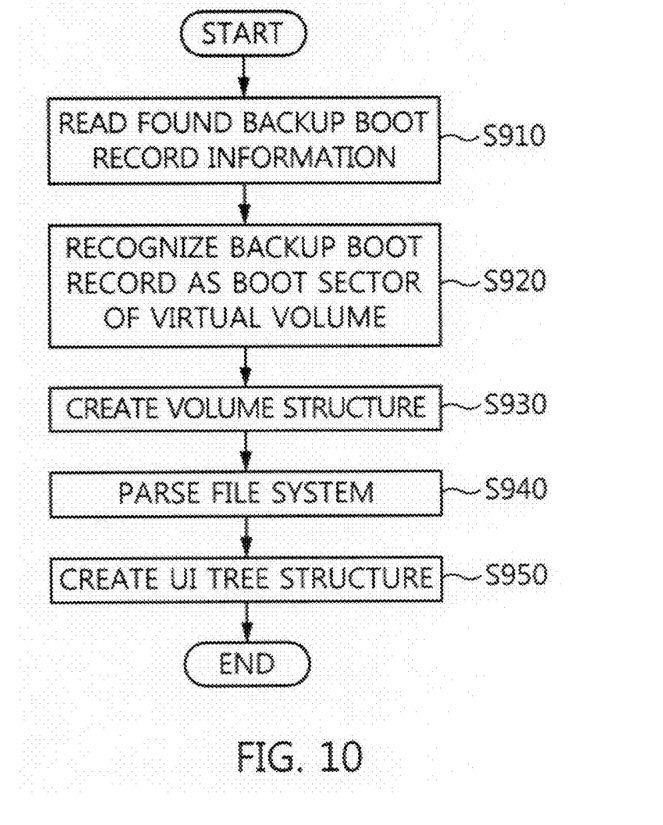
FIG. 10 is as flowchart showing a process for recovering a partition using a backup boot record value, the validity of which has been verified.

Next, a process in which the file system creation unit 80 recovers a partition will be described with reference to FIG. 10. FIG. 10 is a flowchart showing a process for recovering a partition.

First, partition recovery information is read at step S910, and the backup boot record found in the process of FIG. 6 is recognized as the boot record of a virtual volume and then analyzed at step S920.

The location of the boot record of the virtual volume is individually calculated for NTFS, FAT32, and FAT64, by the following Equation (8):

$$NTFS\_BR_{offset} = S_c(\text{backup boot record current location}) - T_v(\text{total number of sectors in volume})$$

$$FAT32\_BR_{offset} = S_c(\text{backup boot record current location}) - S_b(\text{backup sector value which is offsets 50 to 51, generally 6})$$

$$FAT64\_BR_{offset} = S_c(\text{backup boot record current location}) - S_b(\text{value of location in backup sector of FAT64 file system, generally 12}) \quad (8)$$

In the case of NTFS, since a backup boot record is located at the last location of the volume, the location of the original boot record is found by subtracting the total number of sectors of the volume from the found current location of the backup boot record sector. In the case of FAT32 and FAT64, if the value of the backup boot record sector is subtracted from the found current location of the backup boot record sector, the location of the original boot record is found.

The structure of a virtual volume is created by recognizing the found backup boot record as the boot record of the partition desired to be recovered at step S930, and the file system is parsed in step S940. Then, a deleted file or directory is recovered, and the tree structure of files or directories is created by the user interface unit 90 based on the recovered file or directory and is provided to the user at step S950.

In accordance with the embodiments of the present invention, an unallocated area is extracted and checked without all sectors being checked, a sector in which the backup boot record of a hard disk is to be located is read by the unit of a cylinder, or a sector in which a backup boot record is to be located is read by the unit of advanced-format sectors, and it is verified whether the sector is it valid backup boot record. Thereafter, when a partition is recovered, a virtual volume can be generated and can be accessed in the same manner as a normal volume. Accordingly, even if existing boot record information is deleted, and the recovery of a partition is impossible, the partition can be recovered by recognizing a backup boot record as the original boot record of the partition using information about the backup boot record as long as the backup boot record is present.

Further, the present invention is advantageous in that, in a case where partition information is not present in a Master Boot Record (MBR), even if the boot record of the partition is deleted in a conventional partition recovery technique for searching for only the boot record and recovering the partition, it is possible to recover the partition as long as a backup boot record is present, and in that the accuracy of recovery is improved by verifying whether a backup boot record is a valid backup boot record.

Although the configuration of the present invention has been described with reference to the preferred embodiments of the present invention, those skilled in the art will appreciate that various modifications, additions and substitutions are possible without departing from the scope and spun of the invention as disclosed in the accompanying claims. For example, the present invention can be implemented in various forms such as a storage medium in which a program for implementing the partition recovery method according to the present invention is recorded. Therefore, the above-described embodiments should be understood to be exemplary rather than restrictive in all aspects. Further, the scope of the present invention is defined by the accompanying claims rather than the detailed description a the invention. Furthermore, all changes or modifications derived from the scope and equivalents of the claims should be interpreted a being included in the scope of the present invention.

What is claimed is:

1. A method for recovering a partition using backup boot record information, comprising:
    separating an unallocated area from a disk or an evidence image;
    searching the unallocated area for a location of a backup boot record;
    analyzing whether a backup boot record of a file system desired to be detected is present in found sectors;
    if the backup boot record is found to be the backup boot record of the file system desired to be detected as a result of the analysis, verifying whether the backup boot record is a boot record of a valid partition; and
    if it is verified that the backup boat record is the boot record of the valid partition, parsing a file system of a deleted partition using the backup boot record, and recovering a deleted, directory or file,
    wherein searching for the location of the backup boot record is configured to search for the backup boot record depending on a type of file system based on an input sector map table,
    wherein searching for the location of the backup boot record is configured to search the unallocated area while jumping the unallocated area by a unit of a cylinder or by a unit of 2048 sectors, and analyze whether a specific sector is the backup boot record, and
    wherein searching by the unit of the cylinder and searching by the unit of 2048 sectors are simultaneously performed in a form of threads.

2. The method of claim 1, wherein separating the unallocated area comprises:
    analyzing a Disk Operating System (DOS) partition table from the disk or the evidence image, and collecting partition information about a non-deleted normal partition; and
    parsing a file system of the normal partition, collecting information about a normal file and a deleted file, classifying the normal file and deleted file as an allocated area, and classifying a remaining area as the unallocated area.

3. The method of claim 1, wherein separating the unallocated area is configured to convert information about sectors of the disk or the evidence image into Linear Block Addressing (LBA)-based addresses, and classify the sectors into an allocated area and the unallocated area.

4. The method of claim 1, wherein when the file system is a New Technology File System (NTFS), the backup boot record is searched for by jumping to a sector previous to sectors searched by a unit of a cylinder or by a unit of 2048 sectors.

5. The method of claim 1, wherein when the file system is File Allocation Table 32 (FAT-32), the backup boot record is searched for by jumping to a sixth sector of sectors searched by a unit of a cylinder or by a unit of 2048 sectors.

6. The method of claim 1, wherein when the file system is FAT64, the backup boot record is searched for by jumping to a twelfth sector of sectors searched by a unit of a cylinder or by a unit of 2048 sectors.

7. The method of claim 1, wherein determining whether the backup boot record is the boot record of the valid partition comprises, when the file system is an NTFS:
    determining that the backup boot record is the valid backup boot record based on offsets 40 to 47 offsets 28 to 31, and $MFT file name among Master File Table (MFT) entry attributes of an $MFT file; and
    if the $MFT file is not present, determining that the backup boot record is the valid backup boot record, based on offsets 40 to 47, offsets 28 to 31, and $MFTMirr (MFT mirror) file name among MFT entry attributes of an $MFTMirr file.

8. The method of claim 1, wherein determining whether the backup boot record is the hoot record of the valid partition comprises, when the file system is FAT32 or FAT64:
    searching attributes of the backup boot record for a location of a root directory cluster;
    determining whether a corresponding sector has attributes of a directory entry at the location of the root directory cluster; and
    if, among the attributes of the directory entry, offsets 72 to 79 and offsets 96 to 99 correspond to the attributes of the directory entry, verifying that the backup boot record is the valid backup boot record.

* * * * *